(12) United States Patent
Cioffi et al.

(10) Patent No.: US 7,302,379 B2
(45) Date of Patent: Nov. 27, 2007

(54) DSL SYSTEM ESTIMATION AND PARAMETER RECOMMENDATION

(75) Inventors: John M. Cioffi, Atherton, CA (US); Wonjong Rhee, Palo Alto, CA (US)

(73) Assignee: Adaptive Spectrum And Signal Alignment, Inc., Redwood City, CA (US)

( * ) Notice: Subject to any disclaimer, the term of this patent is extended or adjusted under 35 U.S.C. 154(b) by 473 days.

(21) Appl. No.: 10/817,128

(22) Filed: Apr. 2, 2004

(65) Prior Publication Data

US 2005/0123027 A1    Jun. 9, 2005

Related U.S. Application Data

(60) Provisional application No. 60/527,853, filed on Dec. 7, 2003.

(51) Int. Cl.
*G06F 13/10* (2006.01)
*G06F 13/12* (2006.01)
*H04M 1/24* (2006.01)
*H04M 3/22* (2006.01)

(52) U.S. Cl. ............... 703/20; 703/2; 703/21; 379/22.03; 379/23; 379/24; 370/241; 370/251

(58) Field of Classification Search ........... 703/2, 703/20, 21; 379/22.04, 22.03, 23, 24; 370/241, 370/251
See application file for complete search history.

(56) References Cited

U.S. PATENT DOCUMENTS 3,920,935 A    11/1975    Vierling et al.

(Continued)

FOREIGN PATENT DOCUMENTS

DE    100 01 150 A1    7/2001

(Continued)

OTHER PUBLICATIONS

Palomar, D.P. et al. "Optimum Joint Transmit-Receive Linear Processing for Vectored DSL Transmission with QoS Requirements." 36th Asilomar Conf. on Signals, Systems and Computers. Nov. 3-6, 2002. vol. 1, pp. 388-392.*

(Continued)

*Primary Examiner*—Paul Rodriguez
*Assistant Examiner*—Ayal Sharon
(74) *Attorney, Agent, or Firm*—Blakely Sokoloff Taylor & Zafman LLP

(57) ABSTRACT

Estimates of a communication system configuration, such as a DSL system, are based on operational data collected from a network element management system, protocol, users and/or the like. The operational data collected from the system can include performance-characterizing operational data that typically is available in an ADSL system via element-management-system protocols. Generated estimates and/or approximations can be used in evaluating system performance and directly or indirectly dictating/requiring changes or recommending improvements in operation by transmitters and/or other parts of the communication system. Data and/or other information may be collected using "internal" means or may be obtained from system elements and components via email and/or other "external" means. The likelihood of a model's accuracy can be based on various data, information and/or indicators of system performance, such as observed normal operational data, test data and/or prompted operational data that shows operating performance based on stimulation signals. One example of such prompted data uses frequency carrier masks to approximate the Hlog of a given channel, including information regarding bridged taps, attenuation, etc.

18 Claims, 8 Drawing Sheets

U.S. PATENT DOCUMENTS

| | | | |
|---|---|---|---|
| 5,465,287 A | 11/1995 | Egozi | 379/22.02 |
| 5,479,447 A * | 12/1995 | Chow et al. | 375/260 |
| 5,999,540 A | 12/1999 | McGhee | 370/465 |
| 6,058,162 A | 5/2000 | Nelson et al. | 379/22.04 |
| 6,091,713 A | 7/2000 | Lechleider et al. | 370/248 |
| 6,278,485 B1 | 8/2001 | Franchville et al. | 348/192 |
| 6,311,144 B1 | 10/2001 | Abu El Ata | 703/2 |
| 6,414,942 B1 | 7/2002 | Ito et al. | 370/250 |
| 6,417,672 B1 | 7/2002 | Chong | 324/520 |
| 6,453,016 B1 | 9/2002 | Chea, Jr. | 379/29.01 |
| 6,456,694 B1 | 9/2002 | Posthuma | |
| 6,459,702 B1 | 10/2002 | Saaverda et al. | 370/422 |
| 6,463,126 B1 | 10/2002 | Manica et al. | 379/27.01 |
| 6,477,238 B1 | 11/2002 | Schneider et al. | 379/22.04 |
| 6,510,184 B1 | 1/2003 | Okamura | 375/260 |
| 6,534,996 B1 | 3/2003 | Amrany et al. | 324/533 |
| 6,574,308 B1 | 6/2003 | Macdonald et al. | 379/1.04 |
| 6,625,255 B1 | 9/2003 | Green et al. | 379/1.04 |
| 6,658,052 B2 | 12/2003 | Krinsky et al. | |
| 6,819,746 B1 | 11/2004 | Schneider et al. | 379/29.01 |
| 6,870,901 B1 | 3/2005 | Gudmundsson et al. | |
| 6,895,081 B1 | 5/2005 | Schmidt et al. | |
| 6,970,415 B1 | 11/2005 | Galarza et al. | |
| 6,970,560 B1 | 11/2005 | Hench et al. | |
| 6,990,196 B2 * | 1/2006 | Zeng et al. | 379/417 |
| 7,068,755 B2 | 6/2006 | Qiu | |
| 2001/0043647 A1 | 11/2001 | Belge | |
| 2002/0067802 A1 | 6/2002 | Smith et al. | |
| 2002/0075952 A1 | 6/2002 | Verbin et al. | |
| 2002/0114383 A1 | 8/2002 | Belge et al. | |
| 2002/0131537 A1 | 9/2002 | Storm et al. | 375/350 |
| 2002/0172329 A1 | 11/2002 | Rashid-Farrokhi et al. | |
| 2002/0176544 A1 | 11/2002 | Liu et al. | |
| 2003/0026391 A1 | 2/2003 | Kamali et al. | |
| 2004/0086085 A1 | 5/2004 | Nordling et al. | |
| 2004/0095921 A1 | 5/2004 | Kerpez | |
| 2004/0120470 A1 | 6/2004 | Cambron et al. | |
| 2005/0123030 A1 | 6/2005 | Belge | |
| 2005/0135566 A1 | 6/2005 | Schmidt et al. | |
| 2005/0213714 A1 | 9/2005 | Langberg et al. | |
| 2006/0159162 A1 | 7/2006 | Shrikhande et al. | |
| 2006/0164101 A1 | 7/2006 | Fossion et al. | |

FOREIGN PATENT DOCUMENTS

| | | |
|---|---|---|
| EP | 0 695 100 A2 | 1/1996 |
| EP | 1 009 135 A2 | 6/2000 |
| EP | 1 073 247 A2 | 1/2001 |
| EP | 1 213 669 A2 | 6/2002 |
| GB | 1 382 087 A | 1/1975 |
| GB | 2 173 974 A | 10/1986 |
| WO | WO 01/33823 A1 | 5/2001 |
| WO | WO 01/35607 A1 | 5/2001 |
| WO | WO 01/35611 | 5/2001 |
| WO | WO 01/35614 | 5/2001 |
| WO | WO 02/03152 A2 | 1/2002 |
| WO | WO 02/13009 A1 | 2/2002 |
| WO | WO 02/13405 | 2/2002 |
| WO | WO 03/005598 A1 | 1/2003 |

OTHER PUBLICATIONS

Lee, Jungwon et al. "A Multi-User Rate and Power Control Algorithm for VDSL." GLOBECOM '02. Nov. 17-21, 2002. vol. 2, pp. 1264-1268.*

Zeng, Chaohuang et al. "Crosstalk Identification in xDSL Systems." IEEE Journal on Selected Areas in Communications. Aug. 2001. vol. 19, Issue 8, pp. 1488-1496.*

International Telecommunication Union, "ITU-T Recommendation G.993.2." Study Group 15, TD 168 (PLEN/15). May 16-27, 2005. pp. 1-14, 84-94, and 158-161.*

International Search Report, International Application No. PCT/IB2004/003958 (8 pgs), (Jul. 20, 2005).

Written Opinion of the International Searching Authority, International Application No. PCT/IB2004/003958 (11 pgs), undated.

Starr et al., "DSL Advances," Chapters 3, 7 and 11; Prentice-Hall, 2003 (173 pgs).

Aldana, "Interference Estimation for Multicarrier Systems," Electrical Engineering Department, Stanford University, Oct. 2000 (40 pgs).

J. Cioffi et al., "Channel Identification with Dynamic Spectrum Management," ANSI Contribution TIEI.4/2001-147, May 7, 2001 (8 pgs).

International Search Report, International Application No. PCT/IB2006/000496 (5 pgs).

Written Opinion of the International Searching Authority, International Application No. PCT/IB2006/000496 (5 pgs).

* cited by examiner

DSL SYSTEM ESTIMATION AND PARAMETER RECOMMENDATION

CROSS-REFERENCE TO RELATED APPLICATIONS

This application claims the benefit of priority under 35 U.S.C. § 119(e) of U.S. Provisional No. 60/527,853 filed on Dec. 7, 2003, entitled DYNAMIC MANAGEMENT OF COMMUNICATION SYSTEM, the disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communications systems. More specifically, this invention relates to estimating the configuration of a group of channels or lines in a communication system such as a DSL system.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

"xDSL" and "DSL" are terms for used to generally refer to digital subscriber line equipment and services, including packet-based architectures, such as ADSL, HDSL, SDSL, SHDSL, IDSL VDSL and RADSL. DSL technologies can provide extremely high bandwidth over embedded twisted pair, copper cable plant. DSL technologies offer great potential for bandwidth-intensive applications.

ADSL or asymmetric digital subscriber line services generally use existing unshielded twisted pair copper wires from a telephone company's central office (CO) to a subscriber's premise. ADSL modems at both the CO and remote locations send high-speed digital signals over the copper wires and may be capable of providing a downstream bandwidth of about 1.5 Mbps-6.144 Mbps (8 Mbps in ADSL1 and used in Japan and China already), and an upstream bandwidth of about 32 Kbps-640 Kbps with loop distances ranging to 5.5 km.

HDSL or high bit rate DSL provides a symmetric, high-performance connection over a shorter loop, typically requires two or three copper twisted pairs, and is capable of providing both upstream and downstream bandwidth of about 1.5 Mbps over loop distances of up to about 3.7 km. SDSL or single line DSL provides a symmetric connection that matches HDSL data rates using a single twisted pair, but operates over a shorter loop of up to about 3.0 km. VDSL or very high bit rate DSL typically is implemented in asymmetric form, as a very high speed variation of ADSL over a very short loop. Specifically, target downstream performance is typically about 52 Mbps over local loops of 300 m, 26 Mbps at 1,000 m, and 13 Mbps at 1,500 m. Upstream data rates in asymmetric implementations tend to range from about 1.6 Mbps to about 2.3 Mbps. VDSL also offers symmetric data rates of typically 10-25 Mbps. Newer versions of VDSL known as VDSL2 promise symmetric data rates of 100 Mbps and downstream rates to 150 Mbps in asymmetric configurations. Additionally, there are a small number of nonstandard RADSLs or rate adaptive asymmetric DSLS, which, like ADSL, provide a dynamic data rate that adapts to the length and quality of the line (and used a line transmission method that is now nearly defunct in DSL called QAM or CAP). These versions of DSL utilize a packet-based approach that does away with the line-grabbing practice of circuit switched networks. This packet-based approach works well in a variety of situations.

DSL services are much more dependent on line conditions (for example, the length, quality and environment of the copper loop) than traditional telephone services, which typically use a bandwidth including frequencies up to about 4 kilohertz compared to DSL services which utilize a bandwidth including frequencies sometimes over 1 MHz. While some local loops are in great condition for implementing DSL (for example, having short to moderate lengths with minimal bridged taps and splices) many local loops are not as suitable. For example, local loop length varies widely. Moreover, the wire gauge for a local loop may not be consistent over the length of the loop, having two or more different gauges spliced together. Still further, many existing local loops have one or more bridged taps (a length of wire pair that is connected to a loop at one end and is unconnected or poorly terminated at the other end). This type of line information (for example, wire gauge information, bridged-tap information, segment information and load coil information) is important to the evaluation of DSL systems and configurations. Another important class of line conditions is the noise measured on the line, which can be caused by radiation from other DSLs ("crosstalk"), radio ingress of AM or amateur radio stations, thermal noises in the line or receiver analog components, various appliances at the home, electronic equipment in the loop plant or at the central office. These types of noises can vary from time to time and be relatively stationary, impulsive or a combination of both. This type of information also can be important for the evaluation of DSL systems and configurations.

The different conditions and configurations of these loops, including how they are arranged and operated within bundles or binders from the telephone company CO and other locations, mean that every group of DSL loops is different and thus behave differently. Information may exist about individual lines, or can be determined using earlier techniques (for example, evaluation using voice-band measurement and loop-qualification methods). However, this information fails to take into account the interaction among lines (active and inactive), including interactions such as crosstalk (that is, unwanted interference and/or signal noise passed between adjacent lines that occurs due to coupling between wire pairs when wire pairs in the same or a nearby bundle are used for separate signal transmission). Moreover, the accuracy of some of this information is questionable; it has been found that line quality varies widely, even among lines in the same group. Further, voice-band measurements do not always accurately reflect the DSL environment of loops. Therefore, techniques that evaluate a single line in each binder or other group, for example, and then extrapolate that information to all other lines in such a group, may not provide accurate information about those other lines or even the evaluated line itself.

Other techniques include characterizing DSL transmission lines using time-domain reflectometry, in which a predetermined test signal is sent from a point of origin to a DSL transmission line, the line reflects a portion of the signal back to the point of origin, and the reflected signal is analyzed to determine transmission line characteristics. In other situations, a reference loop might be analyzed and/or characterized to generate a transfer function and to model the effects of attenuation, noise, etc. on signals in the reference loop. Typically, one reference loop is selected in each binder or other group of lines and evaluated.

However, these techniques for evaluating a single loop or line do fail to take into account the environmental operation of these lines. That is, there are environmental conditions that affect line performance beyond the behavior of the line alone. Testing a single reference loop may develop some basic information about the line itself, but such information does not assist in the understanding and implementation of optimized services to many users who are using the grouped lines contemporaneously.

Another problem with the testing, monitoring, and maintenance required for successful DSL deployment is the fact that different parties frequently use and operate adjoining DSL lines. For example, some lines in a CO might be operated by an ILEC (Incumbent Local Exchange Carrier), which utilize their own operational and usage rules and systems. Other lines in the same binders and/or other groupings might be operated by one or more CLECs (Competitive Local Exchange Carrier), which are in direct competition with the ILECs in the marketplace, and which likewise have their own operational and usage rules and systems. The exclusionary and competitive nature of these situations, and others like them, mean that there is little opportunity to obtain specific information about the DSL line environment.

Systems, methods and techniques that permit modeling of DSL systems, including DSL binders and other groups, would represent a significant advancement in the art. In particular, management systems may provide only limited information nominally on the line and a system that could infer substantially more information from that limited information would represent a considerable advancement in the field of DSL service rates and associated ranges.

BRIEF SUMMARY OF THE INVENTION

Estimates of a given xDSL system configuration are based on operational data collected from a network element management system, protocol, users and/or the like. Using a generated estimate, an estimator and/or controller (such as a dynamic spectrum manager) may then control (or recommend) one or more operational modes for users and/or other parts of the communication system, for example by setting users' data rates, transmit power levels, etc. The approximation or estimate obtained using the present invention is valuable for various purposes, including but not limited to, assisting users in optimizing their use of the system or detecting lines whose performance can be significantly improved with minimal change of line configuration. The operational data collected from the system can include performance-characterizing operational data that typically is available in an ADSL system via element-management-system protocols. The estimator and/or controller can perform the methods and implement the present invention in various ways.

The estimator, controller and/or other components can be a computer-implemented device or combination of devices that collect and analyze appropriate operational data. Generated estimates can be used in evaluating system performance and directly or indirectly dictating/requiring changes or recommending improvements in operation by transmitters operating on the system. The controller and/or estimator can be located anywhere, residing in some cases in the DSL CO, while in other cases they may be operated by a third party located outside the CO.

Data may be obtained from the communication system via available means, including for example data and/or information described by the G.997.1 (G.ploam) standard and the like. Data and/or other information may be collected using techniques internal to a given communication system or may be obtained from system elements and components via email and/or other "external" means.

The estimator and/or controller may be an ILEC or CLEC operating a number of DSL lines from a CO or other location. Collecting means acquires the available operational data and provides this data to estimating means that may be coupled to an operating mode instruction signal generating means in the controller. This signal generator may be configured to generate and send operating mode instruction signals to users and/or other parts of the communication system (for example, ADSL transceivers). These instructions may include acceptable data rates, transmit power levels, coding and latency requirements, etc. The system configuration sought to be approximated can include the number of users, the number of lines (active and/or inactive), operational characteristics of the system, etc. Data may be collected once or over time, for example on a periodic basis, an on-demand basis or any other non-periodic basis, thus allowing the estimator to update its system configuration approximation, if desired.

Methods according to the present invention can be performed by a controller, estimator, dynamic spectrum manager, computer, etc. One or more initial models may be selected. These models may be parameterizable and might be based on or include the channel insertion-loss transfer function for a known or parameterized length (and any known or parameterized bridged-tap lengths and positions), any inferred or operational data regarding individual users' power levels and/or their corresponding PSD levels, the bit error or time-averaged versions of errors (such as errored seconds and/or code violations with time), their corresponding code settings and/or the parameterized shaped PSDs of potential noises. Models may also be selected at a later time in the process.

Data is collected from available sources (for example, "internally" with TL1 commands, SNMP, XMP or other protocols or "externally" over the internet). The collected data is evaluated and compared to the model(s) currently under consideration. If an initial model or group of potential models was not selected before data was collected, then one or more models may be selected after initial data collection. The model(s) may then be refined, modified, discarded and/or new models selected, depending on the results of the evaluation. A history of collected data over time may be mined to refine the choice and alteration or adjustment of one or more models. Where the estimator achieves a suitable estimate of the system configuration, the estimator or controller then can send recommendations, instructions or other communications to transceivers, users and/or other parts of the communication system. These instructions may be requirements for operational modes or may be recommendations for improving performance and/or services for that user. Such instructions may concern setting data rates, transmit power levels, spectral shaping and composition, etc. and may request or command that additional excitations of the line (perhaps under different data conditions such as different data rates, different start/minimum and/or end/maximum frequencies in DMT and/or different PSD or power levels) that might allow better match to existing or conjectured models in the estimator.

The likelihood of a model's accuracy (determined, for example, by a maximum likelihood methodology) can be based on various data, information and/or indicators of system performance, such as observed normal operational data (generated by users' "normal" use of the system) that shows operating performance based on normal operation signals, and/or test data (generated by testing normally conducted on the system) that shows operating performance, and/or prompted operational data (generated by stimulating the xDSL system) that shows operating performance based on stimulation signals.

One example of such prompted data uses frequency carrier masks to approximate the Hlog of a given set of frequencies. Information regarding bridged taps, attenuation, etc. can be determined from such information.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

Figure 1:
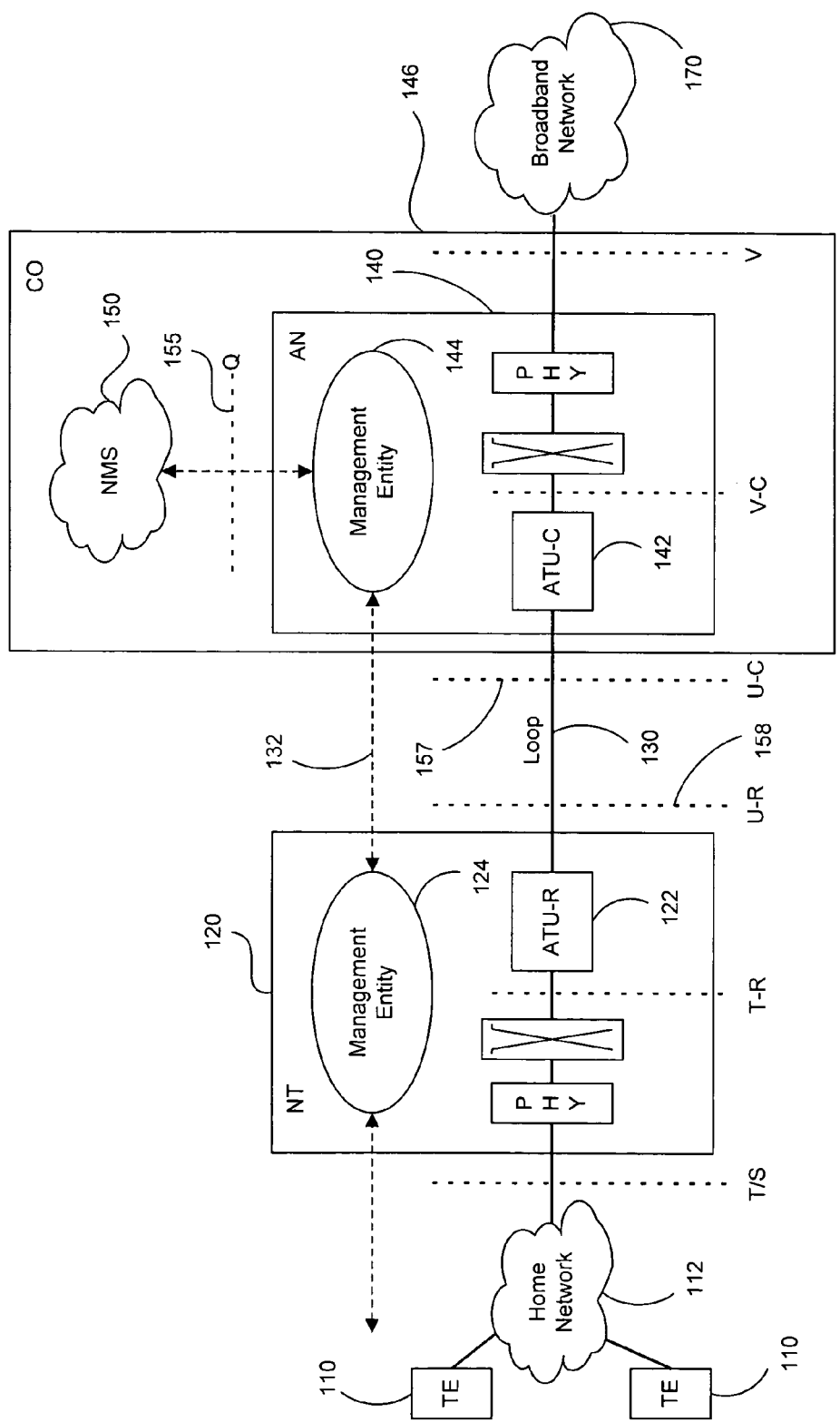
FIG. 1 is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention estimate the configuration of a given xDSL system based on operational data collected from a network element management system, protocol or the like. Using an estimate thusly generated, a controller then controls the operational mode (or may recommend a mode), for example by setting users' data rates, transmit power levels, etc. While the exact configuration of the xDSL system may not be determinable, the approximation or estimate obtained using the present invention is nevertheless extremely valuable for various purposes, including but not limited to, assisting users in optimizing their use of the system or detecting lines whose performance can be significantly improved with minimal change of line configuration. The operational data collected from the system can include performance-characterizing operational data that typically is available in an ADSL system via element-management-system protocols. An estimator and/or controller (for example, a dynamic spectrum manager or other independent entity) can perform the methods and implement the present invention in various ways.

As described in more detail below, an estimator implementing one or more embodiments of the present invention can be part of a controller (for example, a dynamic spectrum manager or spectrum management center). These components can be a computer-implemented device or combination of devices that collect and analyze appropriate operational data. Generated estimates can be used in evaluating system performance and directly or indirectly dictating/requiring changes or recommending improvements in operation by transmitters operating on the system. The controller and/or estimator can be located anywhere. In some embodiments, the controller and/or estimator reside in the DSL CO, while in other cases they may be operated by a third party located outside the CO. The structure, programming and other specific features of a controller and/or estimator usable in connection with embodiments of the present invention will be apparent to those skilled in the art after reviewing the present disclosure.

The following examples of embodiments of the present invention will use ADSL systems as exemplary communications systems. Within these ADSL systems, certain conventions, rules, protocols, etc. may be used to describe operation of the exemplary ADSL system and the information and/or data available from users and/or equipment on the system. However, as will be appreciated by those skilled in the art, embodiments of the present invention may be applied to various communications systems, and the invention is not limited to any particular system. The present invention can be used in any data transmission system for which knowledge of the system configuration would be valuable.

Various network management elements are used for management of ADSL physical-layer resources, where elements refer to parameters or functions within an ADSL modem pair, either collectively or at an individual end. A network management framework consists of one or more managed nodes, each containing an agent. The managed node could be a router, bridge, switch, ADSL modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which is incorporated herein in its entirety by reference for all purposes. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+(G.992.5) and the G.993.x emerging VDSL standards, as well as the G.991.1 and G.991.2 SHDSL standards, all with and without bonding. This model is well known to those skilled in the art.

The G.997.1 standard specifies the physical layer management for ADSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that is available at an access node (AN).

In FIG. 1, users' terminal equipment 110 is coupled to a home network 112, which in turn is coupled to a network termination unit (NT) 120. NT 120 includes an ATU-R 122 (for example, a transceiver defined by one of the ADSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 are used for determining and collecting performance data. The Q-interface 155 provides the interface between the NMS 150 of the operator and ME 144 in AN 140. All of the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in Technical Report TR-005, entitled "ADSL Network Element Management" from the ADSL Forum, dated March 1998, which is incorporated herein by reference in its entirety for all purposes. Also, Working Text WT-87 (Rev. 6), entitled "CPE WAN Management Protocol" from the DSL Forum, dated January 2004 is incorporated herein by reference in its entirety for all purposes. Finally, Working Text WT-082v7, entitled "LAN-Side DSL CPE Configuration Specification" from the DSL Forum, dated Jan. 5, 2004 is incorporated herein by reference in its entirety for all purposes. These documents address different situations for CPE side management.

As will be appreciated by those skilled in the art, at least some of the parameters described in these documents can be used in connection with embodiments of the present invention. Moreover, at least some of the system descriptions are likewise applicable to embodiments of the present invention. Various types of operational data and information available from an ADSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk due to its being far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
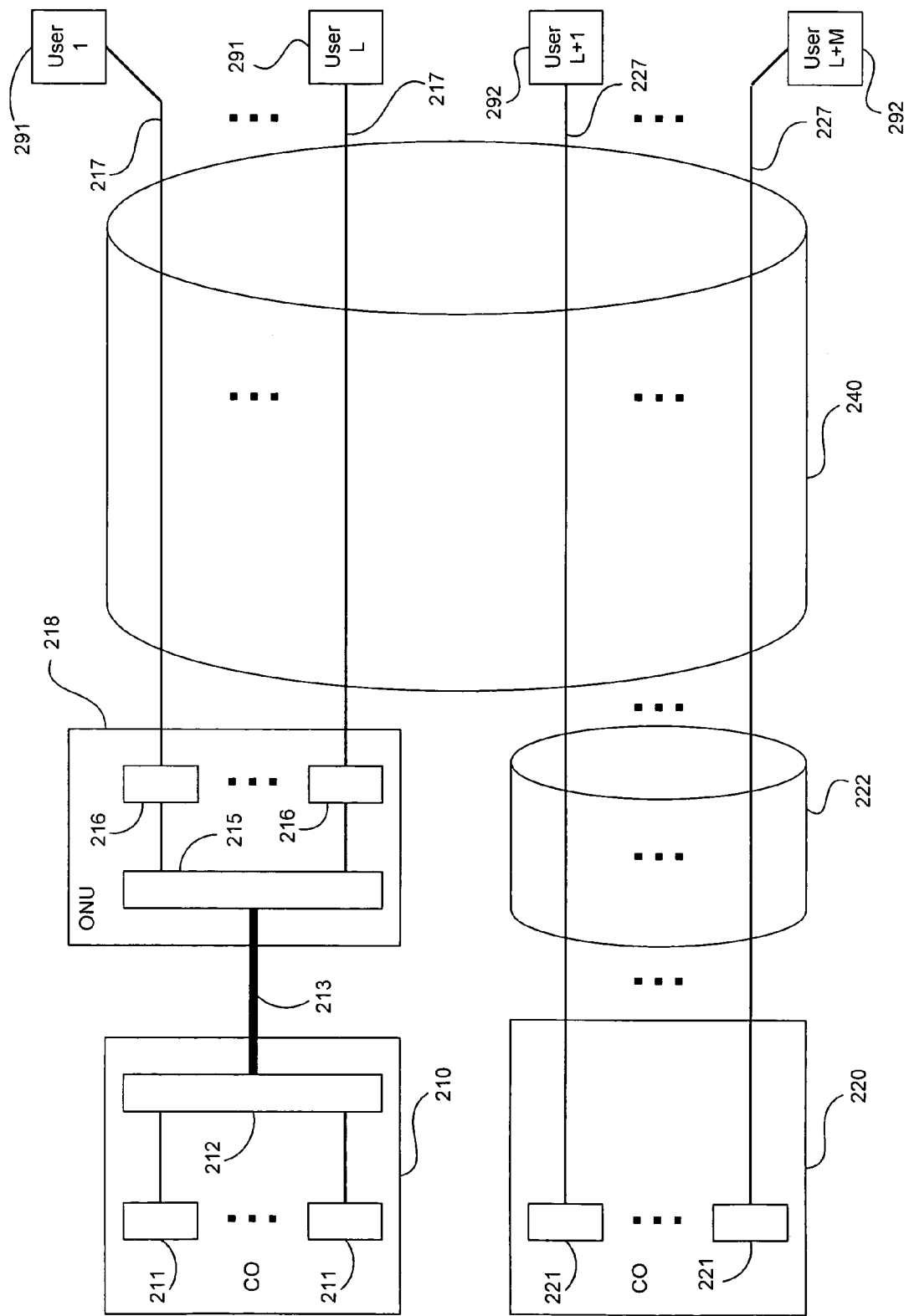
FIG. 2 is a schematic block diagram illustrating a generic, exemplary DSL deployment.

A generic, exemplary DSL deployment scenario is shown in FIG. 2. All the subscriber loops of a total of (L+M) users 291, 292 pass through at least one common binder. Each user is connected to a Central Office 210, 220 through a dedicated line. However, each subscriber loop may be passing through different environments and mediums. In FIG. 2, L users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from CO 220 to users 292 share binder 222, which is not used by the lines between CO 210 and users 291. Moreover, another binder 240 is common to all of the lines to/from CO 210 and CO 220 and their respective users 291, 292.

Figure 3:
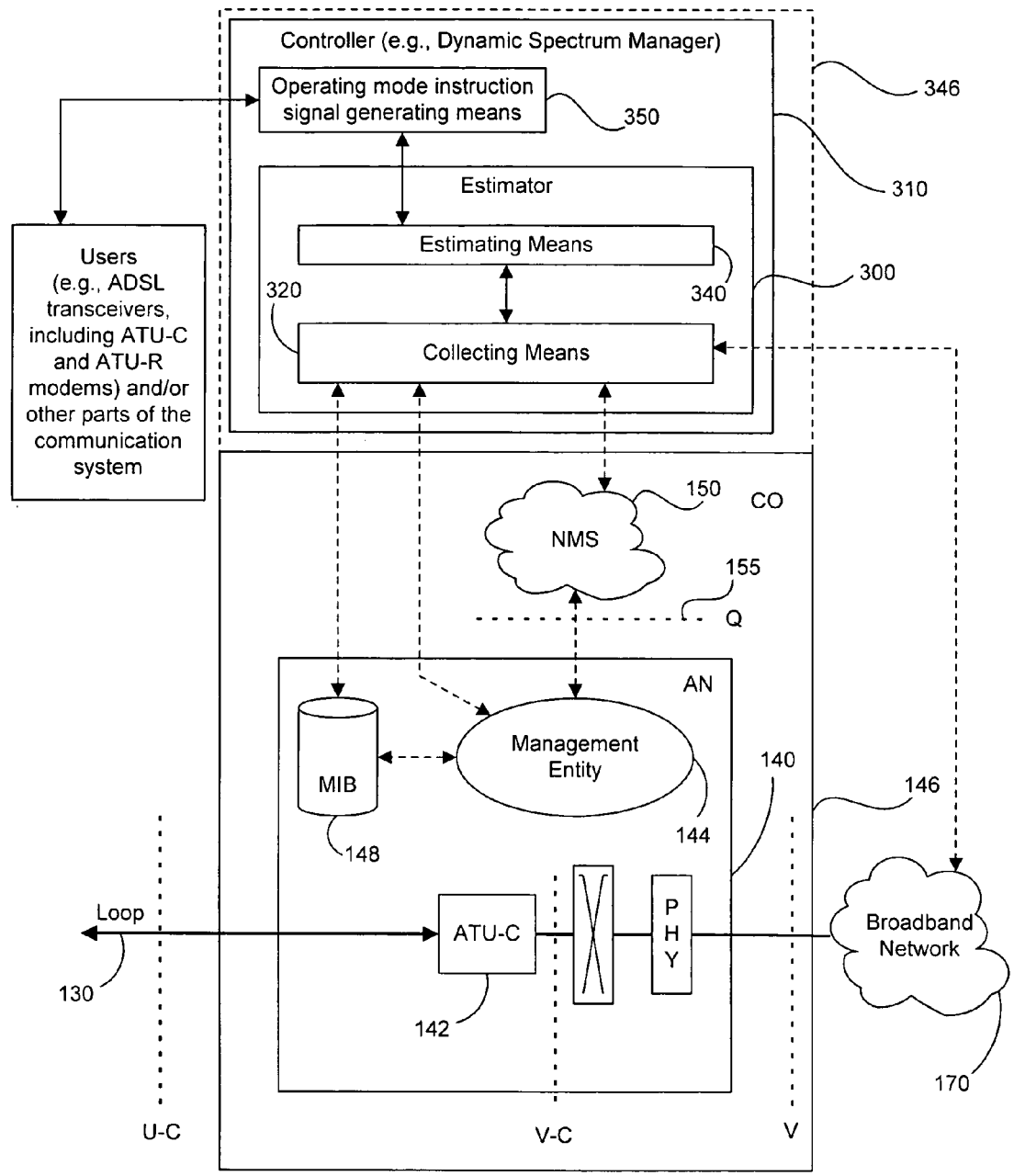
FIG. 3 is a schematic block diagram of one embodiment of the present invention in a DSL system.

According to one embodiment of the present invention shown in FIG. 3, the estimator 300 may be part of an independent entity monitoring a DSL system as a controller 310 (for example, a dynamic spectrum manager) assisting users and/or one or more system operators or providers in optimizing their use of the system. Such a dynamic spectrum manager can benefit greatly from knowing an exact or approximate system configuration. (A dynamic spectrum manager may also be referred to as a Dynamic Spectrum Management Center, DSM Center, System Maintenance Center or SMC.) In some embodiments, the controller 310 may be an ILEC or CLEC operating a number of DSL lines from a CO or other location. As seen from the dashed line 346 in FIG. 3, controller 310 may be in the CO 146 or may be external and independent of CO 146 and any company operating within the system. Moreover, controller 310 may be connected to and/or controlling multiple COs. In the exemplary system of FIG. 3, the estimating means 340 is coupled to an operating mode instruction signal generating means 350 in the controller 310. This signal generator 350 is configured to generate and send operating mode instruction signals to users in the communication system (for example, ADSL transceivers). These instructions may include acceptable data rates, transmit power levels, coding and latency requirements, etc.

The system configuration sought to be approximated can include the number of users, the number of lines (active and/or inactive), operational characteristics of the system, etc. As will be appreciated by those skilled in the art, if the controller/dynamic spectrum manager is a wholly independent entity (that is, not owned and/or operated by the company owning and/or operating lines within the CO), much of the system configuration information is unavailable. Even in cases where a CLEC or ILEC functions as the controller 310, much of the system configuration data may be unknown.

The estimator 300 includes collecting means 320 and estimating means 340. As seen in FIG. 3, the collecting means 320 may be coupled to NMS 150, ME 144 at AN 140 and/or the MIB 148 maintained by ME 144. Data also may be collected through the broadband network 170 (for example, via the TCP/IP protocol or other means outside the normal internal data communication within a given DSL system). One or more of these connections allows the estimator to collect operational and/or performance data from the system. Data may be collected once or over time. In some cases, the collecting means 320 will collect on a periodic basis, though it also can collect data on-demand or any other non-periodic basis, thus allowing the estimator 300 to update its system configuration approximation, if desired.

In some embodiments of the present invention, the estimator 300 may be implemented in a computer such as a PC, workstation or the like. The collecting means 320 and estimating means 340 may be software modules, hardware modules or a combination of both, as will be appreciated by those skilled in the art. For management of large numbers of lines, databases may be introduced and used to manage the volume of data generated by the lines. The estimated system configuration may be determined using a maximum likelihood (ML) methodology. In such approaches, which are well known to those skilled in the art, certain comparisons and other data may be weighted more heavily, depending upon the likelihood of one configuration relative to another. Such likelihood can depend on known characteristics or likely characteristics of the loop inferred from phone-company records, previous data collected on previous uses of the line, or general practices inferred from a mass of data collecting over a large body of such systems over time. Other methodologies that can be used with or in place of maximum likelihood approaches are also well known to those skilled in the art.

Maximum likelihood, defining a measure of closeness, attempts to find among the set of postulated models the model that has the smallest difference from the collected data—or equivalently is thus the most likely system configuration. Several measures of closeness, along with several parameterized sets of channel models, may be defined and used as the process proceeds and more is learned about what works best. This may depend on service provider practices, binder manufacturers, noises in different areas, etc.

For example, it may be possible to base a prediction or estimate on at least the reported maximum rate, bit table, current rate, margin at that rate and attenuation from the minimally reporting current ADSL1 systems in the field. Such information can be processed by the estimator and compared estimations regarding a number of postulated line lengths, with or without bridged taps and various noise possibilities, that would generally conform to the downstream and upstream attenuation reported. These estimates can then be compared to the reported values to see how closely they reproduce the current rate, margin, and maximum rate for the reported data. Of particular importance, proximity to the current bit distribution shape may be very helpful in assessing a best or reasonable parameterized model for the estimator (for instance bit distributions with holes may indicate the presence of bridged taps and/or narrowband radio noise).

Figure 4:
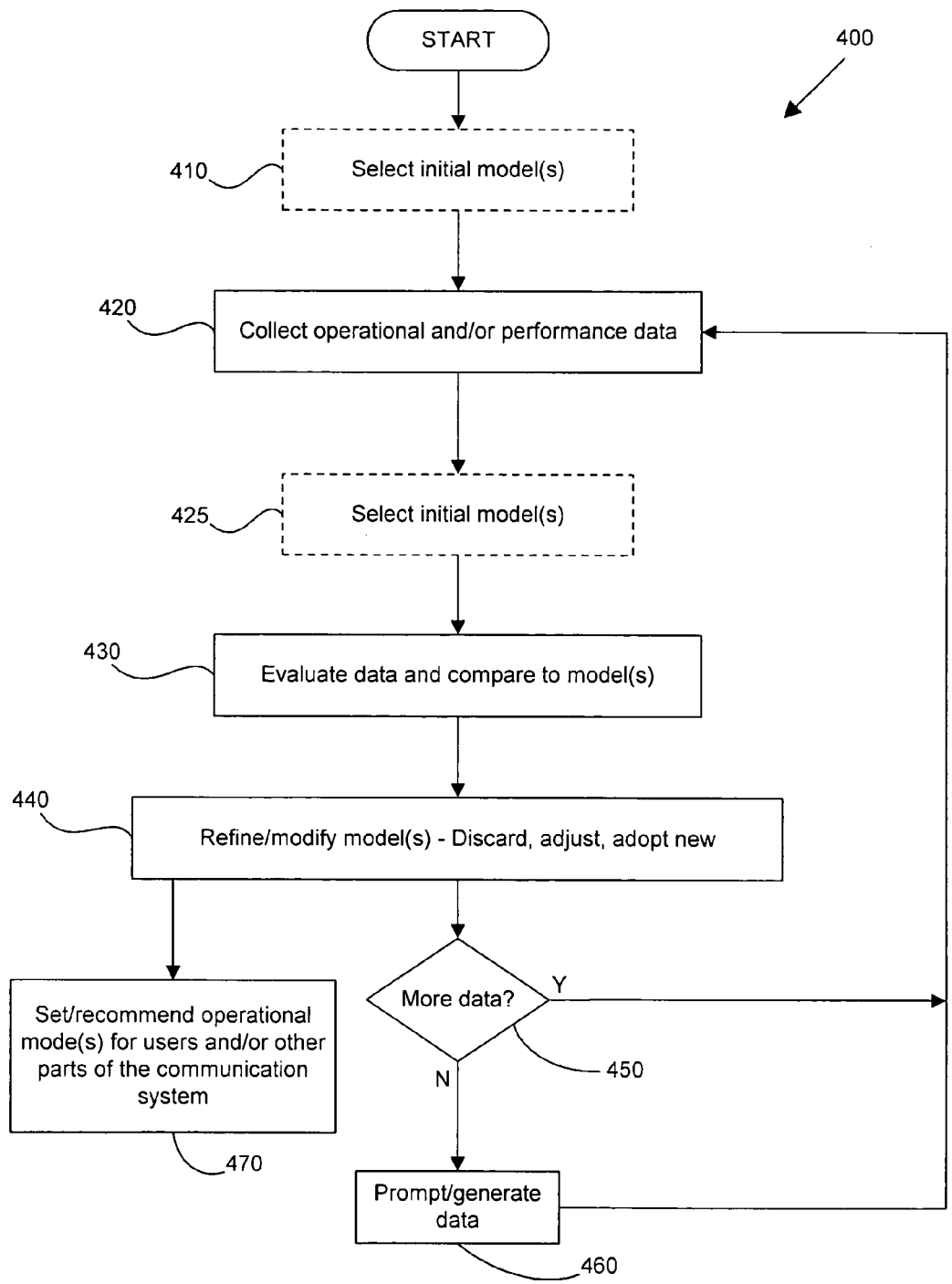
FIG. 4 is a flow diagram of methods according to one or more embodiments of the present invention.

An embodiment of one method according to the present invention is shown in FIG. 4. The method 400 can be performed by a controller, estimator, dynamic spectrum manager, computer, etc. After starting, one or more initial models may be selected at step 410. For example, a standard 50 pair binder with average crosstalk and transmission properties might be chosen. Other models could include a single pair with various noise models or various numbers or combinations of pairs, pair lengths, bridged-tap positions and/or noise combinations. Alternately, a series of common, different model types might be selected as guides. These models may be parameterizable. Parameterized models might be based on or include the channel insertion-loss transfer function for a known or parameterized length (and any known or parameterized bridged-tap lengths and positions), any inferred or operational data regarding individual users' power levels and/or their corresponding PSD levels, the bit error or time-averaged versions of errors (such as errored seconds and/or code violations with time), their corresponding code settings and/or the parameterized shaped PSDs of potential noises. Models may also be selected at a later time in the process.

Data is then collected at step 420 from available sources (for example, data can be collected from an AN ME "internally" with TL1 commands, SNMP or other protocols through the service provider's network management system or operations center; it also would be acceptable if transmission is possible from the AN ME to send data "over the internet" or "externally"; or data can be collected from a remote ME via the embedded operations channel bits, or alternately over the internet). Again the types of data and the frequency of data collection can be determined by those skilled in the art (for example, different data sets may be collected at different times). The collected data is then evaluated and compared to the model(s) currently under consideration at step 430. If an initial model or group of potential models was not selected before data was collected, then one or more models may be selected at step 425 (of course, new models may be selected at any time in the process). The selection of models at step 425 might be preferred in some cases where an estimator wants some initial data on which to base the selection of potential models. At step 440, the model(s) may then be refined, modified, discarded and/or new models selected, depending on the results of the evaluation. A history of collected data over time may be mined to refine the choice and alteration or adjustment of one or more models.

Where the estimator achieves a suitable estimate of the system configuration, for example after refining one or more models at step 440, the estimator or controller then can send recommendations, instructions or other communications to transceivers, users and/or other parts of the communication system at step 470. These instructions may be requirements for operational modes or may be recommendations for improving performance and/or services for that user. Such instructions may concern setting data rates, transmit power levels, spectral shaping and composition, etc. Such instructions may also request or command that additional excitations of the line (perhaps under different data conditions such as different data rates, different start/minimum and/or end/maximum frequencies in DMT and/or different PSD or power levels) that might allow better match to existing or conjectured models in the estimator.

This process can be an iterative one, where at step 450 more data is sought. If more data is available from user, test or other "normal" line activity, then it is collected again at step 420, evaluated at step 430 and used to refine the model(s) at step 440. If no additional data is available at step 450, an estimator may "prompt" or stimulate the system to generate data at step 460. For example, the estimator can send test signals on inactive user lines or on lines that are not currently carrying DSL services to provide a control signal or data set, then measure the effects on other lines, as reflected in the those other lines' performance. The process may also view the times of excitation of signals (test, prompted or normal user data) on various lines to determine which lines interfere with one another and to what extent or degree. Data collected may be considered in connection with loop records where users are in common binders or cables. This type of analysis can lead to a more accurate assessment of mutual crosstalking levels, particularly since those levels may vary over a wide range (for example, 4 orders of magnitude or more) between the same two pairs in different cables because of imperfections in cable construction and twisting. Such information can lead to dramatic improvement in the subsequent assessment of data rates and services to be offered on DSL lines to customers.

Operational data that may be collected in current DSL systems (for example, ADSL1 systems) can include, for example: (1) channel average attenuation measurements, (2) channel bit distributions, (3) channel transmit power levels, (4) reported current data rates, (5) reported maximum possible data rates, (6) reported error-correction-parity and/or other overheads (which, though not reported, might be inferred from other data), (7) use of trellis codes (which also typically must be inferred), (8) ATM or other protocol cell counts (which denote user activity levels), (9) time stamps for evaluating mutual effects and absolute time-dependent line conditions, (10) vendor identification and serial numbers, (11) time stamp for a major change in transmission parameters as in retraining, (12) the number of major changes in parameters or attempts to change parameters, and/or (13) code violations, FEC violations, and/or errored second counts.

Additionally, data may be collected in future DSL systems that may further include, for example: (14) frequency-dependent measured channel insertion loss, gain, phase, and/or logarithmic magnitude; (15) frequency-dependent measured quiet-line or active-line noise levels, (16) transmitted PSD levels, (17) signal-to-noise ratios, (18) bits and gains quantities from bit-swapping, (19) various other quantities such as echo responses (depending on the equipment manufacturer), (20) worst-case noise changes and associated times, (21) detailed FEC error location indications, (22) carrier masks (CARMASK of G.997.1 or similar), (23) tone-spectral shaping parameters (for example, the TSSpsds, TSSpsus and/or PSDMASK MIB element in G.997.1), (24) vectored or matrix channel characterizing data, (25) the frequency/tone index of highest noise change in a recent interval of time, (26) the total number of bit-swaps occurring in a recent time interval, (27) the distribution of FEC errors, code violations and/or errored seconds violations over several successive sub-intervals of an interval programmed by a dynamic spectrum manager or determined in another way, (28) the peak-to-average ratio of noise or MSE measurements and/or variations over a recent time interval, and/or (29) higher-level protocol-throughput measures. As more types of operational data and means for acquiring such data become available, embodiments of the present invention can be upgraded to provide more accurate system estimates and better recommendations regarding system parameters and operations.

Item (25) above, the frequency/tone index of highest noise change in a recent interval of time, is the tone index that indicates on which tone the noise changed most during a recent measured interval (for example, a default period of 30 seconds or a programmed period). Such a feature allows a controller (such as a dynamic spectrum manager) to know of frequencies particularly affected by time-varying noises such as crosstalk that turns on and off. A controller might ML detect that one or more crosstalkers are significant in some band via this information (for instance seeing how this data changes, perhaps only showing two levels (high and low), indicating only one strong crosstalker turning on/off—or more levels, indicating that more than one crosstalker is significant). Knowledge at the DSM center of the excitation patterns and telephone/binder numbers of other crosstalkers could allow the maximum likelihood inference of which lines significantly crosstalk into one another.

Item (26), the total number of bit-swaps occurring in a recent time interval, allows a controller to determine if noise is relatively stationary on a given DSL line, or varying with time on that line. More stationary lines (showing more uniformity and/or consistency over time) might have their MAXSNRM reduced, etc. The number of swaps can also be a good indicator of which crosstalker(s) turned on, etc.

Finally, item (27), the distribution of forward error corrections, code violations and/or errored seconds violations over several successive sub-intervals of an interval (for example, programmed by a dynamic spectrum manager or determined in another way), helps a controller or estimator determine the degree of intermittency of noise. As will be appreciated by those skilled in the art, there typically are 4 levels of errors reported in ADSL systems: errored seconds (reported every second); severely errored seconds; code violations (reported every 17 ms in ADSL1); and FEC errors (reported every S symbols—so that if S=1, then the errors are reported every 250 microseconds). If FECs are counted in short intervals (for example, 1 second or smaller), then an estimator or controller can get an idea of how distributed an intermittent noise is. If at some short enough interval (for example, length of S packet, where the S packet is a "short" packet of data information delivered to the dynamic spectrum manager that contains the FEC errors among other information such as margin levels, power, and related quantities) successive reported FEC errors are found to be "bursty," then interleaving will help further. If the reported FEC errors are about the same for all short intervals, then interleaving will not help, and the parity should be increased. Thus, an estimator or controller can ML detect whether the impulse noise is "bursty" or more uniform and, indeed, how far apart the bursts are (if the noise is entirely uniform, then the noise is almost stationary and bit-swapping should get it).

During this process, each potential model's likelihood of accuracy can be evaluated. One or more models that best fit the collected operational data and any other empirical evidence can be chosen to serve as a model (or models) for considering improvements and/or other changes to the system. Again, the likelihood of a model's accuracy can be based on various indicators of system performance, such as:

- Observed operational data (generated by users' "normal" use of the system) that shows operating performance based on normal operation signals; and/or
- Test data (generated by testing normally conducted on the system) that shows operating performance; and/or
- Prompted operational data (generated by stimulating the xDSL system) that shows operating performance based on stimulation signals.

The model(s) can be continuously/periodically updated and revised, depending on the data collected and evaluated (or may be updated on a non-periodic and/or prompted basis).

The prompted operational data can be time-relative events (using the time-stamp field referred to in the Appendices) to allow the dynamic spectrum manager to view "cause-effect" relationships between the lines. This allows the manager to determine lines that may be crosstalking into one another. Such knowledge allows a number of approaches to further improvements in DSL performance, as will be appreciated by those skilled in the art. For an ML estimation method, time-indexing events on different lines in the DSM center may be used, ascertaining likely mutual interferers and thus more accurately modeling the situation. This time-variation and correlation concept can be extremely useful. For example, even when lines are not changing at all, knowing which ones are really affecting one another can be very useful.

Figure 5:
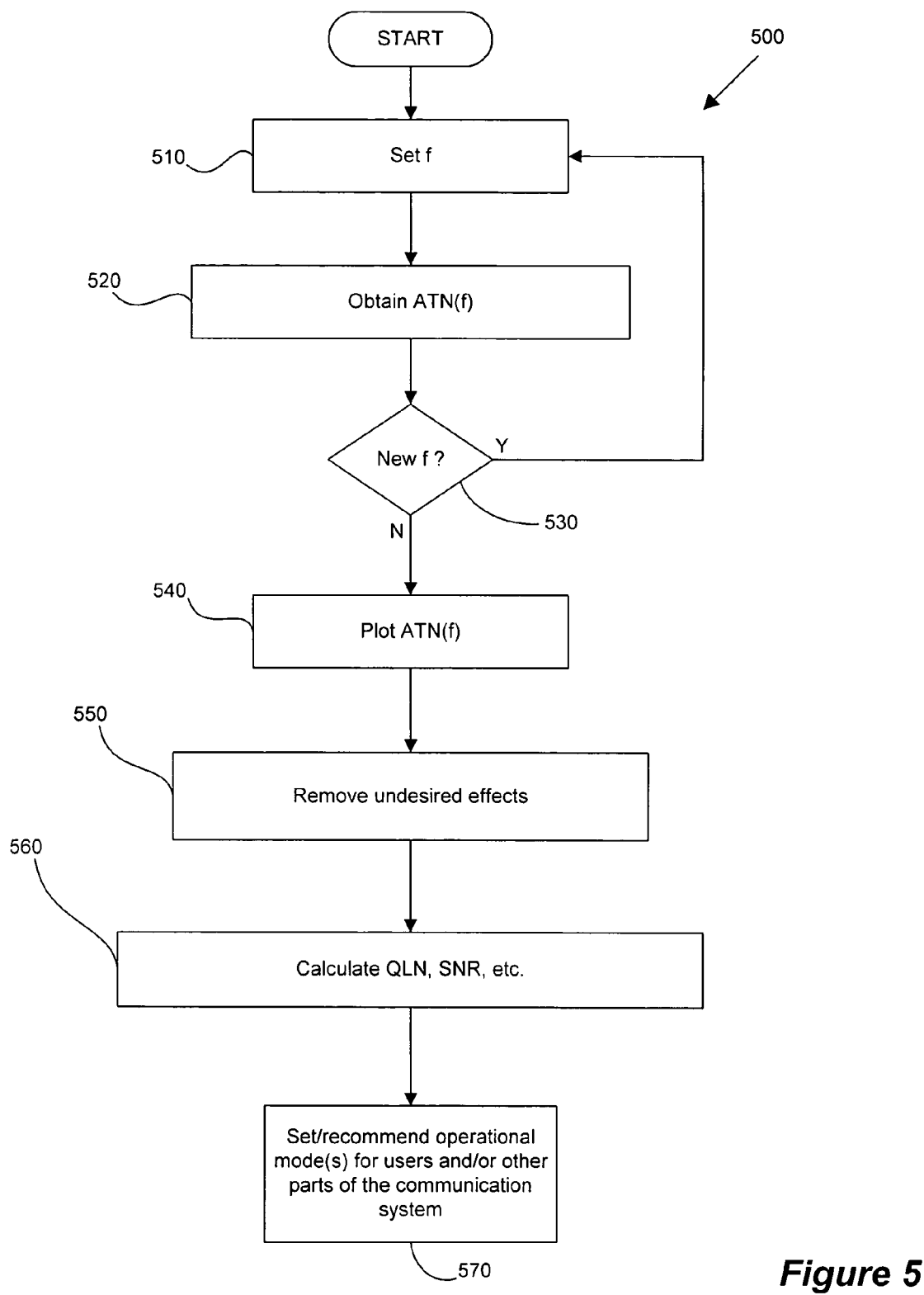
FIG. 5 is a flow diagram of methods for acquiring and calculating the Hlog of a channel, according to one or more embodiments of the present invention.
Figure 6:
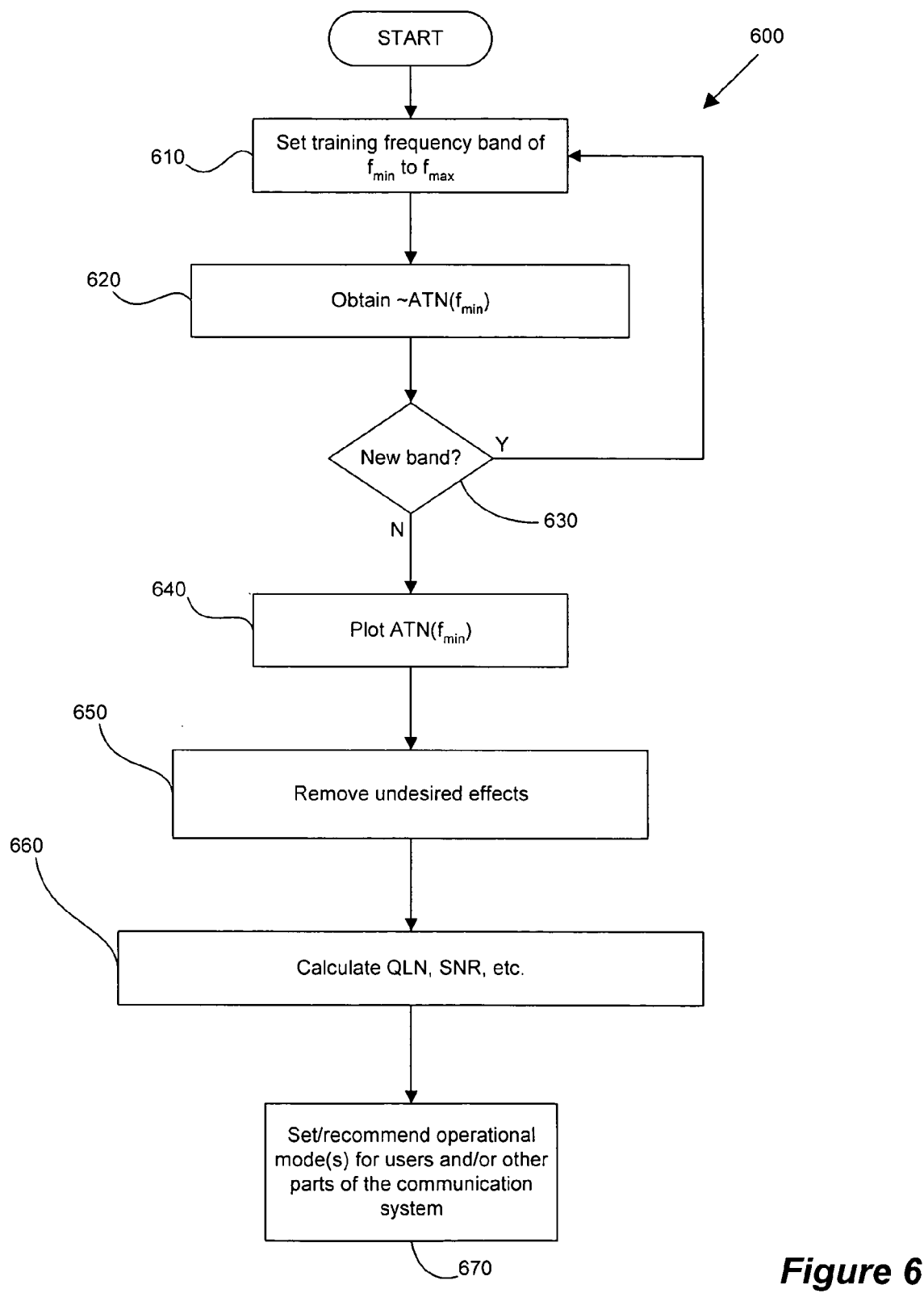
FIG. 6 is a flow diagram of alternate methods for acquiring and calculating the Hlog of a channel, according to one or more embodiments of the present invention
Figure 7:
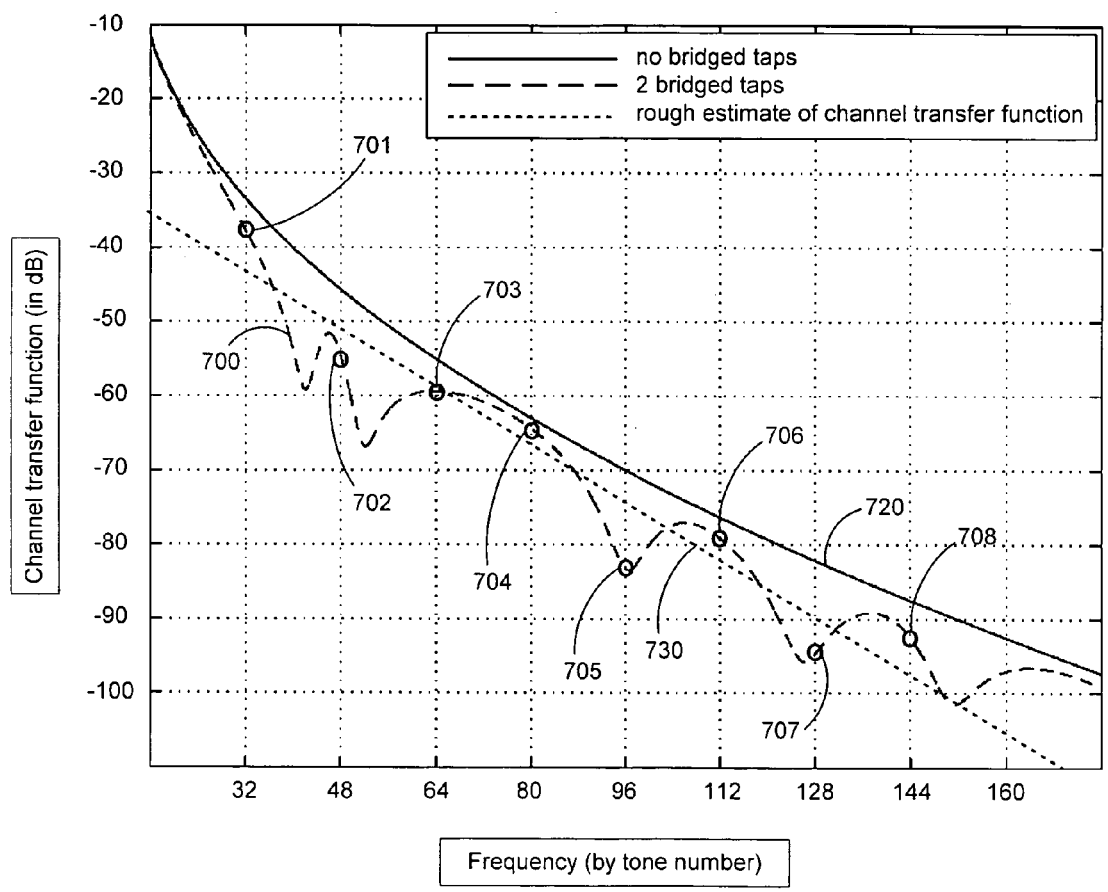
FIG. 7 is a graphical depiction of estimated Hlog data obtained and calculated according to one or more embodiments of the present invention.

Another example of prompting the generation of operational data can be seen in connection with FIGS. 5-7. Signals transmitted through copper pairs are attenuated due to the power dissipation caused by the resistance of the wires. The attenuation, or insertion loss, depends on loop length, making it more challenging to provide high rates over long loops. For example, usually operators do not honor requests for ADSL service if the customer loop exceeds 18 kft. Resistance is not the only impairment in transmission lines. In fact, a metal wire is characterized in general by a cascade of elementary two-port networks, as will be appreciated by those skilled in the art.

Phase velocity and the phase delay of the transmitted signal vary with respect to the frequency as a result of capacitance and inductance effects. Moreover, signal attenuation also depends on the frequency, leading to a non-flat attenuation characteristic. The magnitude of the transfer function for a 750 meter 26 gauge (0.4 mm) twisted pair (which is 6 dB lower than the insertion loss if the line is properly terminated) is shown as line 720 in FIG. 7.

Line 700 shows the "notching" effect of bridged taps on the channel characteristic. Bridged taps are twisted pairs that are connected to some point of the loops and left unterminated at the other end. Due to the signal attenuation and the resulting notched channel characteristic, bridged taps cause rate loss and severe inter-symbol interference in DSL frequencies. Unfortunately, for the largest part of the telephone network, existing databases are not always accurate, and it is impossible to know the exact location of the bridged taps. In North America, roughly two thirds of the loops have bridged taps, and of these, half have two or more taps. While operators have been developing bridged tap location methods, it is expected that many DSL loops will retain their bridged taps. For systems in operation, the channel is continuously measured and its transfer function is estimated in order to calculate modulation parameters and guarantee reliable operation.

Hlog, quiet line noise (QLN), and run-time noise (MSE) are information regarding channel gain and average noise power over all tones used in transmitting data. Downstream Hlog and QLN are estimated accurately during training of an ATU-R modem, and those estimations are available at the ATU-R. MSE is estimated during run-time (sometimes called "showtime" in ADSL). However, the values are not reported to the ATU-C and there is thus no way of knowing downstream Hlog, QLN and/or MSE at the ATU-C. Because ADSL1 does not pass these parameters to the ATU-C, accurate information on downstream Hlog, QLN and/or MSE has been considered unavailable at the ATU-C and has thus never been used in operational decision making and/or parameter setting. ADSL2 does pass these parameters to the ATU-C but ADSL2 is not in wide use and requires that both the ATU-C and ATU-R are ADSL2-compliant, a situation that currently is unlikely. Even then, an ADSL customer may replace their ADSL2 modem with an ADSL1 modem (for example, a modem used at some time previously in an office or residence). Over 100 million ADSL1 modems are currently in existence.

QLN is the measured noise when the modem is neither active nor training. However, the noise may change significantly with time. This noise at later times during operation is referred to herein as MSE noise (Mean-Square-Error noise) or MSE function. The MSE noise can be estimated at any time by the follow formula (using dB)

$$MSE[n]=PSD[n]+Hlog[n]-SNR[n]$$

(where Gap in dB is (9.5+TSNRM−CODEGAIN) and SNR $[n] \approx 10^{Gap/10} \times 2^{(2B[n])} - 1$ is reported in ADSL2 modems and is computable from past or current reported bit distributions B[n] in ADSL1 modems). The SNR may be computed or inferred using initial PSD, Hlog and/or QLN. The PSD[n] =REFPSD+G[n] (where G[n] is the known or estimated gains table value in dB), and REFPSD=NOMPSD−PCB. Since G[n] usually satisfies −2.5 dB<G[n]<2.5 dB in ADSL1 modems, but might not be reported, G[n] can be estimated by looking for B[n] table changes, usually being near −2.5 dB on the tone with higher number of bits between two adjacent tones and usually near +2.5 dB on the tone with lower number of bits between two adjacent tones.

Even though downstream Hlog and QLN (and/or MSE) are not reported to the ATU-C, other data such as the downstream bit distribution, downstream margin, downstream transmit power and downstream attenuation are typically reported back to the ATU-C. In particular, downstream attenuation is calculated as the average attenuation of the information bearing tones, and this provides a reasonable approximation (which can be refined using the bit distribution) of the attenuation of the lowest frequency tone among the information bearing tones. In other words, in a downstream transmission, the value of Hlog is dominated by the lowest data-bearing frequency ($f_{min}$) in the used band (and, to some degree, several of the frequencies above $f_{min}$), meaning that the attenuation measured for a relatively small band of data bearing frequencies bounded at its lower end by $f_{min}$ will be a good approximation for Hlog($f_{min}$). Therefore, the Hlog of several tones among the tones used can be closely estimated using the downstream attenuation. The available profile and TL1 functionalities in some ADSL systems can be used in these techniques.

As will be appreciated by those skilled in the art, $f_{min}$ typically is the lowest frequency in a selected carrier mask. However, this may not always be true. A selected band of frequencies (in a carrier mask, for example) may include one or more lower frequencies that are not used (that is, to which bits are not assigned during bit loading) for various reasons (such as when the channel for this frequency is so poor that it is not assigned any bits). In such situations, the bottom most frequency may not therefore be $f_{min}$. A controller evaluating line attenuation will know from the reported bit distribution what the value of $f_{min}$ is (where $f_{min}$ is the lowest data bearing frequency and/or tone). In the present discussion and accompanying drawings, $f_{min}$ may be assumed to be the lowest tone and/or frequency in the selected carrier mask, which is a valid assumption in most situations. However, embodiments of the present invention contemplated those situations where $f_{min}$ may not be that lowest frequency in the carrier mask. Embodiments of the present invention also may intentionally increase $f_{min}$ specifically for the purpose of measuring the attenuation at a set of different frequencies in successive training intervals.

When a group of Hlog approximation values are obtained for several frequencies, the points plotted on a transfer function graph can be used to generate a line approximating Hlog. Two methods for obtaining this approximation are shown in FIG. 5 and FIG. 6. As seen in FIG. 7, one or more of the data points 701-708 can be obtained using one of the methods of FIGS. 5 and 6. In the example of FIG. 7, points 701, 702, 703, 704, 705, 706, 707 and 708 correspond to tones 32, 48, 64, 80, 96, 112, 128 and 144, though other tones and/or frequencies could be used, as will be appreciated by those skilled in the art. If only two points are obtained, these would define a line through the two points. In the case of 3 or more points, as shown in FIG. 7, these points can be used to approximate a line 730 and to determine any variance therefrom. As noted below, line 730 is a rough estimate of the channel transfer function and may or may not be of value in a given situation. As more data points are collected, a more accurate depiction of the true transfer function 700 (including the effects of bridged taps, if any) can be developed. In FIG. 7, the true channel transfer function including bridged tap effects is shown as line 700.

As can be seen from that plot, transfer function 700 (Hlog) has several "dips" and may have some displacement from 720 (which represents the channel transfer function if no bridged taps were present). The sinusoidal dips in a transfer function typically are due to bridged taps in the line. The number and length of such taps (2 taps in the case of FIG. 7) distort the "no bridged taps" transfer function 720, resulting in the channel becoming function 700, which is the true representation of the capacity of the DSL line being tested. However, lines 720 and 730 can be useful in some situations. For example, line 720 represents the channel capacity if any bridged taps present were removed. This might provide an operator with a suitable evaluation tool for deciding whether a truck roll is warranted to repair/upgrade the user's DSL line. As will be appreciated by those skilled in the art, the difference between lines 700 and 720 in FIG. 7 represents the data capacity lost because of the presence of the bridged taps. Additionally, some remote locations may have attenuators connected to their lines (remnants of prior telco problem-locating efforts). This additional attenuation can likewise be estimated from the measured data and the line capacity increase from a truck roll can be calculated, for example in cases where higher speeds are desired. Line 730 represents a rough approximation of the transfer function. While not very accurate, line 730 may nevertheless be useful in situations where only a small number of data points are available to the controller in determining Hlog. The rough estimate data can still be used in improving system performance and/or estimating the configuration of the system by a dynamic spectrum manager and/or the like. Moreover, the rough estimate can be further improved by utilizing information such as the bit distribution.

Using appropriate bridged-tap models, line 700 can be estimated from whatever points are available (for example, two or more of points 701-708 in FIG. 7). If needed, undesirable effects can be removed using suitable approximations the effects on Hlog 700 (or Hlin). However, effects typically should not be removed that would affect the accuracy of the estimation of the line insertion loss. It is helpful for dynamic spectrum managers and/or service-provider operations personnel to be able to consider the effects of bridged taps. Filters on the channel likewise can affect the measured attenuation values and might need to be removed from the measured data points. Removal of modem-filter effects might be necessary for many situations where filtering inside of the modem improves performance but clouds the appearance of the measured transfer function from being the true insertion loss. All these corrections to the measured attenuation values are known to those skilled in the art, as are techniques for removing and/or accounting for their influence on the Hlog values. Three or more points corresponding to three Hlog[n] values at different tones can be used to infer slope and bridged-tap length theoretically, with more than 3 points making a fit to possible known insertion-loss curves more informative and allowing determination of multiple bridged-tap lengths.

When the final approximation of Hlog is determined, the line can be used in several ways. For example, the slope of line 720 is proportional to the length of the twisted-pair line. Moreover, the noise value can be obtained when the Hlog values are considered along with known bit distributions and known transmit power-spectral-density levels. Therefore, using ADSL1 technology, ADSL2 data and operational characteristics can be determined and used to optimize and/or otherwise improve ADSL1 system operation in systems where the element management system does not provide some or all of this useful information.

Embodiments of the present invention use multiple trainings of the ATU-R using different carrier masks. Each individual training provides a data point of the transfer function showing Hlog. Different techniques can be used to generate these transfer function data points, including (but not limited to):

FIG. 5—A carrier mask having only one data bearing tone f is selected 510 (given, for example, in either Hz or as a DSL tone number), the attenuation ATN(f) is obtained 520 and this can be repeated 530 as appropriate. ATN(f) is plotted 540 and any effects that are undesirable can be removed 550. Hlog, QLN, etc. can then be calculated 560 and recommendations made as to operational modes of users and/or other parts of the communication system 570. The reported downstream attenuation for each f selected is close to or the same as the Hlog value of that one active tone (providing Hlog values for any tones used and generating an approximation of the transfer function plot). And/or FIG. 6—A carrier mask is selected at 610 which includes a group of tones (using, for example, the CARMASK function of ADSL2) between $f_{min}$ and $f_{max}$ ($f_{min}$ may either be the lowest frequency in the selected band or the lowest data bearing frequency, if the lowest frequency in the band is non-data bearing). ATN($f_{min}$) is obtained at 620 and additional bands may be tested 630, as appropriate. The values of are plotted 640 and any undesirable effects removed 650. Hlog, QLN, etc. can then be calculated 660 and recommendations made as to operational modes of users and/or other parts of the communication system 670. In this method, the downstream attenuation is used to estimate Hlog of the tones near $f_{min}$. In most situations, the lowest frequency in the modem-selected set of tones is $f_{min}$ and thus it the estimation of ATN($f_{min}$) in step 620 is generally quite accurate. By using a variety of values for $f_{min}$ and repeating the training, the Hlog of the whole bandwidth can be well estimated.

In either of the two exemplary methods described, lower tones in the relevant available spectrum can be used. For example, for carrier masks of groups of frequencies in ADSL1 in the method of FIG. 6, tones 32 (centered at 138 kHz), 48, 64 (frequently a pilot tone in some systems), 128, 200 may be used to designate $f_{min}$. These frequencies likewise can be used as the individual tones used in the method of FIG. 5.

The above two examples can be viewed as scanning Hlog using various carrier masks that sweep $f_{min}$ over anywhere from a few to many separated choices. If a given communication system requires use of a pilot tone, that pilot tone may have to be included in any carrier mask used to approximate Hlog. In these cases, use of $f_{min} \leq f_{pilot}$ might be necessary if the approximation that measured attenuation equal to Hlog[$f_{min}$] is to be used. As will be appreciated by those skilled in the art, there are many ways of scanning Hlog, but methods and techniques selecting multiple carrier masks and repeating training for each choice are simple and effective. In fact, the same applies to upstream, and the upstream attenuations that correspond to a set of upstream carrier masks can be collected and used for estimating Hlog of the upstream band. Ultimately, the Hlog[f] estimates from both upstream and downstream can be processed together to obtain the best estimates of transfer functions 700 and 720 in FIG. 7.

If it is desirable to minimize the number of trainings used to obtain a reasonable approximation of Hlog (for example, where profiles are used for training and the number of profiles is limited), then a subset of tones can be reliably estimated using the downstream attenuation and select carrier masks, interpolating and/or extrapolating the values of Hlog for other tones within and/or outside the tested tones.

Once the Hlog estimate is available at the ATU-C, QLN and/or MSE can be reliably estimated using the bit distribution, the Hlog estimate and other parameters available at the ATU-C, such as the power-spectral density level or equivalents. The reliable estimates of Hlog and QLN or MSE at the ATU-C allow a controller (for example, a dynamic spectrum manager) to collect operational data from only the ATU-C with almost no information loss when compared to situations and techniques where the operational data is collected from both an ATU-C and ATU-R. Therefore, accurate calculations of desirable operation parameters for each line can be reliably done without any direct report of operational data from the ATU-R to a dynamic spectrum manager or other data collection unit.

In some instances, collected and/or reported values or parameters may be used by a controller (such as a dynamic spectrum manager) to identify the type and manufacturer of a modem. For instance, the controller may know that certain combinations of various reported values only occur for a given manufacturer or a specific type of modem. The controller may learn over time with accumulated measurements that certain modems have certain types of reporting and thus be more accurate in predicting whose modem it is. This may be particularly appropriate to estimated high-noise tones, where noise changes by large amounts (or has been observed to change by a large amount) or by several successive reports of FEC error distributions.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
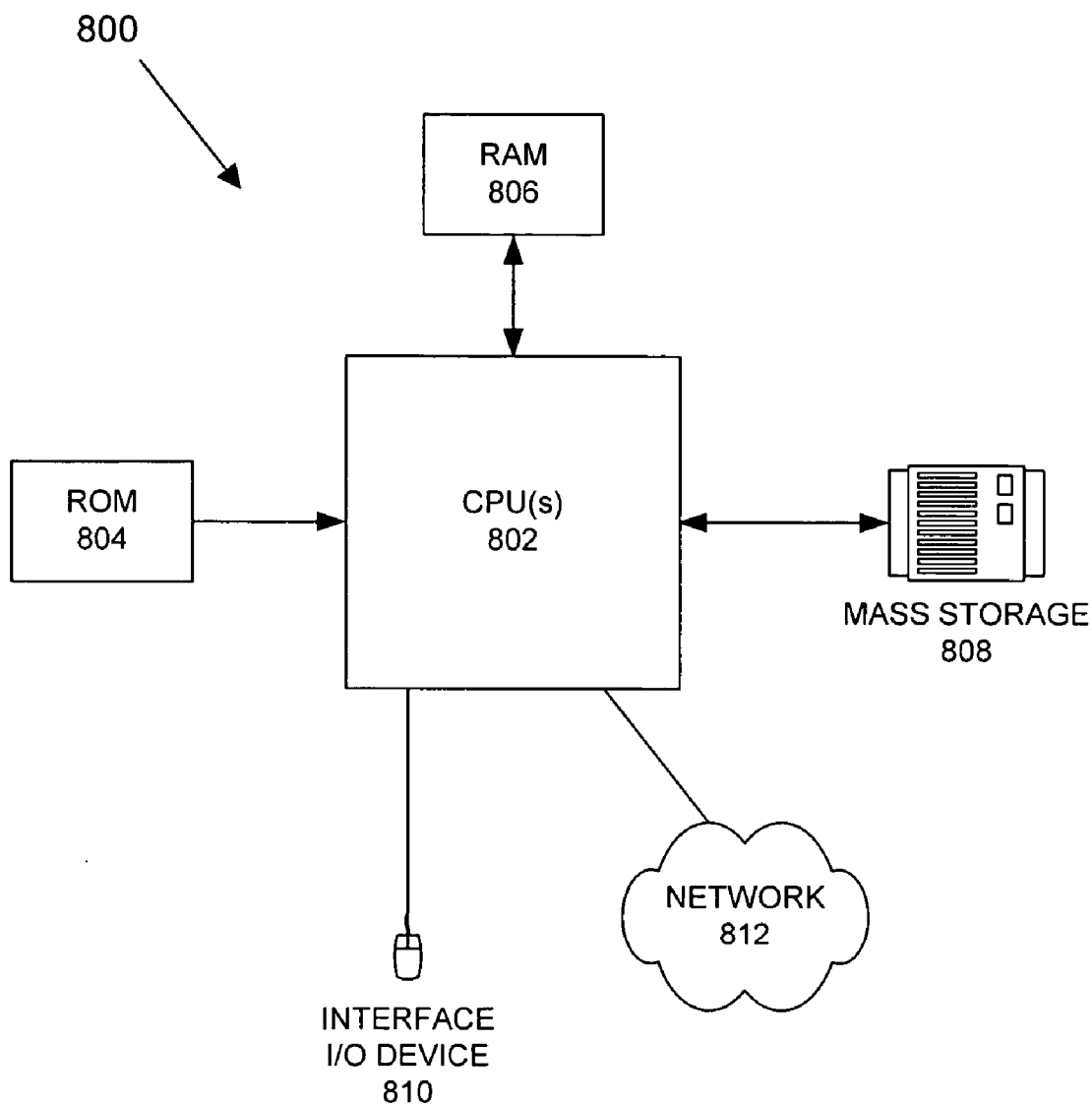
FIG. 8 is a block diagram of a typical computer system or integrated circuit system suitable for implementing embodiments of the present invention

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 or 814 and executed on CPU 802 in conjunction with primary memory 806. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of computing the mean-square-error (MSE) noise of a line in a Digital Subscriber Line (DSL) system, the method comprising:

estimating the Hlog function of the line;

obtaining the power spectral density (PSD) function of the line;

obtaining the signal to noise ratio (SNR) function of the line;

computing the MSE noise by subtracting the SNR from the sum of the PSD and Hlog; and storing or recording the computed MSE noise in a memory.

2. The method of claim 1 wherein obtaining the SNR function comprises computing a SNR function or collecting a reported SNR function.

3. The method of claim 2, wherein the SNR function is computed based on at least one of the following:
   reported past bit distributions;
   reported current bit distributions;
   an initial PSD;
   an Hlog function; or
   quiet line noise (QLN).

4. The method of claim 1 wherein obtaining the PSD function comprises estimating a PSD function or collecting a reported PSD function.

5. The method of claim 1 wherein estimating the Hlog function of the line comprises:
   generating a plurality of attenuation data points, wherein each attenuation data point corresponds to a different frequency carrier mask and comprises an attenuation value, further wherein generating a single attenuation data point comprises:
      setting a data-bearing frequency carrier mask;
      transmitting data using one or more frequencies in the carrier mask;
      receiving an attenuation value for the transmitted data; and
      plotting the attenuation value; and
   performing at least one of the following:
      storing at least one of the following:
         each generated attenuation data point; or
         each plotted attenuation values; or
      generating a graphical depiction of the estimated Hlog function based on the plurality of generated attenuation data points.

6. The method of claim 1 wherein estimating the Hlog function of the line comprises:
   prompting the DSL system to generate operational data, wherein prompting the DSL system to generate operational data comprises:
      setting an operational mode for the DSL system based on one or more of the model parameters; and
      operating the DSL system using the set operational mode to generate the operational data;
   collecting the generated operational data;
   using the collected operational data to generate one or more model parameter values; and
   recording or storing one or more of the generated model parameter values in a memory, wherein Hlog is a model parameter.

7. A Digital Subscriber Line (DSL) system estimator for computing the mean-square-error (MSE) noise of a line in a DSL system, the estimator comprising:
   means for obtaining the power spectral density (PSD) function of the line;
   means for obtaining the signal to noise ratio (SNR) function of the line;
   estimating means configured to estimate an Hlog function of the line;
   computing means coupled to the estimating means and configured to compute the MSE noise by subtracting the SNR from the sum of the PSD and the Hlog; and
   means for storing or recording the computed MSE noise in a memory.

8. The DSL system estimator of claim 7, wherein the means for obtaining the SNR function further comprises a collecting means configured to collect a directly reported SNR function.

9. The DSL system estimator of claim 7, wherein the means for obtaining the SNR function further comprises:
   a computing means configured to compute the SNR based on at least one of the following:
      a reported past bit distribution;
      a reported current bit distribution;
      an initial PSD;
      an Hlog function; or
      quiet line noise (QLN).

10. The DSL system estimator of claim 7, wherein the means for obtaining the PSD function further comprises an estimating means configured to estimate a PSD function or collecting means configured to collect a reported PSD function.

11. The DSL system estimator of claim 7, wherein the estimating means configured to estimate the Hlog function of the line further comprises:
    a means for generating a plurality of attenuation data points, wherein each attenuation data point corresponds to a different frequency carrier mask and comprises an attenuation value, further wherein a means for generating a single attenuation data point comprises:
       means for setting a data-bearing frequency carrier mask;
       means for transmitting data using one or more frequencies in the carrier mask;
       means for receiving an attenuation value for the transmitted data; and
       means for plotting the attenuation value; and
    a means for performing at least one of the following:
       storing at least one of the following:
          each generated attenuation data point; or
          each plotted attenuation values; or
       generating a graphical depiction of the estimated Hlog function based on the plurality of generated attenuation data points.

12. The DSL system estimator of claim 7, wherein the estimating means configured to estimate the Hlog function of the line further comprises:
    means for prompting the DSL system to generate operational data, wherein prompting the DSL system to generate operational data comprises:
       setting an operational mode for the DSL system based on one or more of the model parameters; and
       operating the DSL system using the set operational mode to generate the operational data;
    means for collecting the generated operational data;
    means for using the collected operational data to generate one or more model parameter values; and
    means for recording or storing one or more of the generated model parameter values in a memory, wherein Hlog is a model parameter.

13. A computer program product comprising a machine readable medium upon which is stored instructions for computing the mean-square-error (MSE) noise of a line in a Digital Subscriber Line (DSL) system, the instructions comprising:
    estimating the Hlog function of the line;
    obtaining the power spectral density (PSD) function of the line;
    obtaining the signal to noise ratio (SNR) function of the line;
    computing the MSE noise by subtracting the SNR from the sum of the PSD and Hlog; and
    storing or recording the computed MSE noise in a memory.

14. The computer program product of claim 13, wherein the SNR function is directly reported.

15. The computer program product of claim 13, wherein the SNR function is computed based on at least one of the following:

reported past bit distributions;
reported current bit distributions;
an initial PSD;
an Hlog function; or
quiet line noise (QLN).

16. The computer program product of claim 13, wherein obtaining the PSD function comprises estimating a PSD function or collecting a reported PSD function.

17. The computer program product of claim 13, wherein estimating the Hlog function of the line comprises:
   generating a plurality of attenuation data points, wherein each attenuation data point corresponds to a different frequency carrier mask and comprises an attenuation value, further wherein generating a single attenuation data point comprises:
      setting a data-bearing frequency carrier mask;
      transmitting data using one or more frequencies in the carrier mask;
      receiving an attenuation value for the transmitted data; and
      plotting the attenuation value; and
   performing at least one of the following:
      storing at least one of the following:
         each generated attenuation data point; or
         each plotted attenuation values; or
      generating a graphical depiction of the estimated Hlog function based on the plurality of generated attenuation data points.

18. The computer program product of claim 13, wherein estimating the Hlog function of the line comprises:
   prompting the DSL system to generate operational data, wherein prompting the DSL system to generate operational data comprises:
      setting an operational mode for the DSL system based on one or more of the model parameters; and
      operating the DSL system using the set operational mode to generate the operational data;
   collecting the generated operational data;
   using the collected operational data to generate one or more model parameter values; and
   recording or storing one or more of the generated model parameter values in a memory, wherein Hlog is a model parameter.

* * * * *